United States Patent
Leigh (10) Patent No.: US 9,530,291 B2
(45) Date of Patent: Dec. 27, 2016

(54) SYSTEMS AND METHODS FOR PROVIDING QUALITATIVE INDICATION OF VIBRATION SEVERITY WHILE RECORDING

(71) Applicant: General Electric Company, Schenectady, NY (US)

(72) Inventor: Nigel Trevor Leigh, Canterbury (NZ)

(73) Assignee: General Electric Company, Schenectady, NY (US)

(*) Notice: Subject to any disclaimer, the term of this patent is extended or adjusted under 35 U.S.C. 154(b) by 237 days.

(21) Appl. No.: 14/491,871

(22) Filed: Sep. 19, 2014

(65) Prior Publication Data

US 2016/0086455 A1 Mar. 24, 2016

(51) Int. Cl.
*G08B 5/36* (2006.01)
*G01H 1/00* (2006.01)
*G01S 5/04* (2006.01)

(52) U.S. Cl.
CPC ............... *G08B 5/36* (2013.01); *G01H 1/003* (2013.01)

(58) Field of Classification Search
CPC .......... G01H 1/003; G01H 17/00; G01H 1/00; G01H 1/006; G01H 1/10; G01H 3/00; G01M 13/028; G01M 15/14; G01M 13/04; G01M 13/045; G07C 2009/00928; A61B 2503/10; A61B 5/0051; A61B 5/0205; A61B 5/222; A61B 5/4827; A61H 2201/5043; A61H 2201/5061; A61H 2201/5084; A61H 2201/5097; A61H 31/005; A61M 2205/332; A61M 2205/3334; A61M 2205/3375; A63F 13/54; A63F 2300/105; A63F 2300/303; G01B 17/00; G01P 5/245; G01S 11/14; G01S 15/87; G01S 15/88; G05B 23/0205; G08B 21/187
(Continued)

(56) References Cited

U.S. PATENT DOCUMENTS 6,006,164 A 12/1999 McCarty et al.
7,487,679 B2 * 2/2009 Sirrine .................. G01H 1/003
702/39

(Continued)

FOREIGN PATENT DOCUMENTS

WO 2014032875 A2 3/2014

OTHER PUBLICATIONS

European Search Report and Opinion issued in connection with corresponding EP Application No. 15185692.9 on May 25, 2016.
(Continued)

*Primary Examiner* — Fekadeselassie Girma
(74) *Attorney, Agent, or Firm* — Armstrong Teasdale LLP (57) ABSTRACT

A mobile computing system for providing qualitative indication of vibration recordings of a vibrating machine to a user includes a memory, a display device, and at least one processor configured to receive a vibration recording including a vibration level from a sensor computing device. Collection of the vibration recording is initiated by the user while at the vibrating machine. The processor is also configured to determine a plurality of threshold sets applicable to the vibration recording and select, by the processor, a first available threshold set from the plurality of threshold sets. The processor is also configured to compare the vibration level of the vibration recording to the first threshold set and display to the user a visual qualitative indication of the vibration recording using the display device, thereby enabling the user to determine a quality of the vibration recording while at the vibrating machine.

17 Claims, 5 Drawing Sheets

(58) Field of Classification Search
USPC .............................. 340/683, 511, 5.71, 679
See application file for complete search history.

(56) References Cited

U.S. PATENT DOCUMENTS

| | | | |
|---|---|---|---|
| 8,803,698 B1* | 8/2014 | Heydron | G01H 1/003 340/683 |
| 2005/0231350 A1* | 10/2005 | Littrell | G01H 1/006 340/511 |
| 2007/0270222 A1* | 11/2007 | Yamanaka | A63F 13/42 463/37 |
| 2010/0171588 A1* | 7/2010 | Chutorash | G07C 9/00182 340/5.71 |
| 2011/0224917 A1* | 9/2011 | Uluyol | G01M 13/045 702/34 |
| 2011/0254381 A1* | 10/2011 | Gramlich | B60D 1/62 307/117 |
| 2013/0107036 A1* | 5/2013 | Jensen | G07C 3/00 348/135 |
| 2013/0178335 A1* | 7/2013 | Lin | A63B 71/06 482/8 |
| 2014/0148727 A1* | 5/2014 | O'Brien | A61B 5/4827 600/552 |
| 2014/0160130 A1* | 6/2014 | Williams | G06T 11/206 345/440 |
| 2014/0257150 A1* | 9/2014 | Totman | A61H 31/005 601/41 |
| 2015/0204760 A1 | 7/2015 | Bottcher et al. | |
| 2015/0286391 A1* | 10/2015 | Jacobs | G06F 1/163 715/771 |
| 2016/0129182 A1* | 5/2016 | Schuster | A61M 5/16831 702/56 |
| 2016/0146645 A1* | 5/2016 | Kielb | G01D 13/22 116/201 |
| 2016/0188181 A1* | 6/2016 | Smith | G06F 3/048 715/765 |

OTHER PUBLICATIONS

SKF, "Condition Monitoring Essentials," 50 pages.
Park, Chan-Seob, et al., "Efficient Wireless Vibration Data Sensing and Signal Processing Technique Based on the Android Platform," Department of Computer Engineering, SunMoon University, 10 pages.
"Snapshot IS (Intrinsically Safe) Portable Data Collector," Bently Nevada Asset Condition Monitoring, 14 pages.
Azima DLI, "TRIO," 8 pages.

* cited by examiner

SYSTEMS AND METHODS FOR PROVIDING QUALITATIVE INDICATION OF VIBRATION SEVERITY WHILE RECORDING

BACKGROUND

The present disclosure relates generally to vibration from rotating machines and, more particularly, to providing a qualitative indication of vibration severity while recording vibration data.

Vibration analysis is often used to monitor the mechanical health of machines with rotating components, such as a turbine having a rotor. Typically, vibration analysis of a machine involves a specialist reviewing vibration measurements obtained from a turbine during normal operations, thus allowing the specialist to optimize a maintenance strategy for that machine. In some known systems, a field operator collects vibration data ("recordings") from a plurality of machines at, for example, a power generation facility. However, through human error or through error in the vibration recording equipment, the vibration recordings may be corrupted or otherwise erroneous. For example, if the field operator incorrectly mounted the sensor to the machine, or mounted the sensor to the machine at an incorrect location, or captured the recording from the wrong machine, the recording may be corrupt. If unaware of the improper or otherwise corrupt recordings, the field operator may waste time collecting improper recordings, and the analyst who later inspects the data may not know whether to trust the data.

Accordingly, it would be beneficial for the field operator to have a qualitative indication of the vibration data while recording (e.g., while at the turbine taking measurements).

BRIEF DESCRIPTION

In one aspect, a mobile computing system for providing qualitative indication of vibration recordings of a vibrating machine to a user is provided. The mobile computing system includes a memory, a display device, and at least one processor. The at least one processor is configured to receive a vibration recording from a sensor computing device. The vibration recording includes a vibration level. Collection of the vibration recording is initiated by the user while at the vibrating machine. The at least one processor is also configured to determine a plurality of threshold sets applicable to the vibration recording. The at least one processor is further configured to select, by the processor, a first available threshold set from the plurality of threshold sets. The at least one processor is also configured to compare the vibration level of the vibration recording to the first threshold set. The at least one processor is further configured to display to the user a visual qualitative indication of the vibration recording using the display device, thereby enabling the user to determine a quality of the vibration recording while at the vibrating machine.

In another aspect, a computer-based method for providing qualitative indication of vibration recordings of a vibrating machine to a user is provided. The method uses a mobile computing device including a processor, a memory, and a display device. The method includes receiving, into the memory, a vibration recording from a sensor computing device. The vibration recording includes a vibration level. Collection of the vibration recording is initiated by the user while at the vibrating machine. The method also includes determining, by the processor, a plurality of threshold sets applicable to the vibration recording. The method further includes selecting, by the processor, a first threshold set from the plurality of threshold sets. The method also includes comparing, by the processor, the vibration level to the first threshold set. The method further includes displaying to the user, using the display device, a visual qualitative indication of the vibration recording using the display device, thereby enabling the user to determine a quality of the vibration recording while at the vibrating machine.

In yet another aspect, at least one non-transitory computer-readable storage media having computer-executable instructions embodied thereon is provided. When executed by at least one processor of a first computing device, the computer-executable instructions cause the processor to receive a vibration recording from a sensor computing device. The vibration recording includes a vibration level. Collection of the vibration recording is initiated by a user while at a vibrating machine. The computer-executable instructions also cause the processor to determine, by the processor, a plurality of threshold sets applicable to the vibration recording. The computer-executable instructions further cause the processor to select, by the processor, a first threshold set from the plurality of threshold sets. The computer-executable instructions also cause the processor to compare the vibration recording to the first threshold set. The computer-executable instructions further cause the processor to display to the user a visual qualitative indication of the vibration level using a display device, thereby enabling the user to determine a quality of the vibration recording while at the vibrating machine.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that may permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital media, with the sole exception being a transitory, propagating signal.

As used herein, the terms "software" and "firmware" are interchangeable, and include any computer program stored in memory for execution by devices that include, without limitation, mobile devices, clusters, personal computers, workstations, clients, and servers.

The systems and methods described herein facilitate providing qualitative indication of vibration recordings during data collection (e.g., while at location, or at the point of collection). In one exemplary embodiment, a field operator collects vibration data ("recordings") of a rotating machine such as a turbine, a pump, a compressor, or the like. For example, the field operator may walk a route at a power generation facility that includes a plurality of turbines, each having a rotor that is monitored for machine health. The field operator carries a mobile computing device, or "handheld unit", that directs the operator to the next turbine to be measured, as well as the particular measurement location on that particular turbine. The field operator also carries a portable vibration recorder, or "base unit". The base unit includes a vibration sensor that attaches to the turbine at a measurement location and collects a vibration recording. The base unit is in wireless communication (e.g., Bluetooth) with the handheld unit.

In the example embodiment, the field operator attaches the vibration sensor of the base unit to the measurement location indicated by the handheld and initiates collection of a vibration recording. The base unit collects the vibration recording and wirelessly transmits the data to the handheld unit. The handheld unit analyzes the recording and displays qualitative data about the recording. More specifically, in one embodiment, the handheld unit compares the recording to a set of one or more pre-defined threshold values for the particular turbine, and for the specific measurement location on that turbine. The handheld unit displays the recording relative to the threshold values such that the operator can visually interpret the quality of the recording. For example, if the vibration recording is displayed as outside of the normal bounds, perhaps in a "yellow" level of vibration (e.g., close to the normal operating range, but slightly outside of the expected), then the operator may re-record another recording. If the vibration recording is far outside the normal bounds, this may be an indication to the operator that the recording is somehow corrupt. For example, the operator may have taken a recording of the wrong turbine, or from a different measurement location on the turbine, or the data quality of the recording may have been affected by an incorrectly mounted sensor, or an improper sensor type. As such, the operator can determine, from the visual cues provided by the handheld unit, whether or not the recording is corrupt or otherwise illegitimate.

Further, in the example embodiment, the handheld unit identifies a threshold set (e.g., a set of threshold values) based on the most appropriate data available. More specifically, in one embodiment, a threshold set is selected from a plurality of threshold sets ("threshold determination list") (and optionally for a particular recording type, e.g., a particular frequency range or different processing type such as spectrum, waveform, demodulation) including one or more of: (1) a worst band alarm level for the particular measurement location and/or recording type; (2) an overall alarm level for the particular measurement location and/or recording type; (3) thresholds associated with a baseline value for the particular measurement location and/or recording type; (4) thresholds associated with a previous value for the particular measurement location and/or recording type; and (5) pre-set levels for a particular recording type. In one embodiment, the threshold determination list is an ordered list, and the threshold set is identified based on the first member of the list for which data is available. For example, if neither a worst band alarm level (1) nor an overall alarm level (2) are available for the particular location, but a baseline value (3) is available, then the handheld unit would use thresholds associated with the baseline value as the set of thresholds with which to compare the current vibration recordings. As such, the field operator will see a data comparison of the current vibration recording against the most appropriate metric available.

As described above, at least one of the technical problems addressed by this system includes: (i) confidence, of an operator as they are collecting vibration data, whether the recordings just collected are corrupt; (ii) data interpretation of vibration recording results by less-skilled data collectors in determining whether or not vibration data is corrupt; and (iii) using the most appropriate data available when evaluating for corrupt vibration recordings.

A technical effect of the systems and processes described herein is achieved by performing at least one of the following steps: (a) determining a plurality of threshold sets applicable to the vibration recording; (b) selecting a first threshold set from the plurality of threshold sets; (c) comparing the vibration level to the first threshold set; (d) displaying to the user, using the display device, a visual qualitative indication of the vibration recording using the display device; (e) selecting a first threshold set based at least in part on being a first available threshold set in an ordered list of sets of thresholds; (f) identifying a first threshold set associated with a first pre-defined frequency range and a second threshold set associated with a second pre-defined frequency range; (g) determining a first alarm level for the first pre-defined frequency range of the vibration recording and a second alarm level for the second pre-defined frequency range of the vibration recording, and wherein selecting a first available threshold set further includes selecting one of the first threshold set and the second threshold set as the first available threshold set based at least in part on comparing the first alarm level to the second alarm level; (h) selecting a first threshold set associated with an overall vibration value of the vibrating machine, wherein the overall vibration value is a predetermined value for a measurement type associated with the vibration recording and a measurement location associated with the vibration recording; (i) collecting a vibration recording at a first measurement location; (j) selecting a first threshold set further includes computing a first threshold set associated with one of (1) a baseline value and (2) a prior recording of the vibrating machine associated with the first measurement location; (k) providing a visual qualitative indication as a gauge display representing the first threshold set and a visual indicator of a value of the vibration recording projected relative to the first threshold set; (l) comparing the vibration recording to a second threshold set; (m) and displaying to the user, with the visual qualitative indication, another visual qualitative indication based at least in part on comparing the vibration recording to the second threshold set.

The technical effect achieved by this system is at least one of: (i) providing a qualitative visual indication of a vibration recording while on location (e.g., while at the machine), thereby providing a level of confidence to the collecting operator in the vibration recording recently collected; (ii) providing a visual display to the operator such as can be interpreted by a lesser-skilled operator, thereby not requiring the operator to be a vibration analysis specialist; and (iii) selecting a more applicable or useful threshold set from a plurality of threshold sets to use when evaluating the recently collected vibration recording, thereby using the most appropriate data available.

As used herein, the phrase "while recording" is used generally to refer to the operator and his activities of collecting vibration data. In other words, "while recording" means "while the operator is on location at the machine" during, for example, the walking of her route to record vibration data from a plurality of machines and measurement locations. This phrase is meant to include both while the operator is actively recording data, as well the time shortly after completion of the data collection (e.g., after a recording is complete), while the operator is still at or near the machine recently sampled.

Further, as used herein, the term "recording" (noun) and "measurement" are used synonymously to refer to vibration data (e.g., a complete waveform or spectrum) collected from a machine. These recordings may include one or more samples, and may include resultant data processed from the one or more samples (e.g., an overall value).

Figure 1:
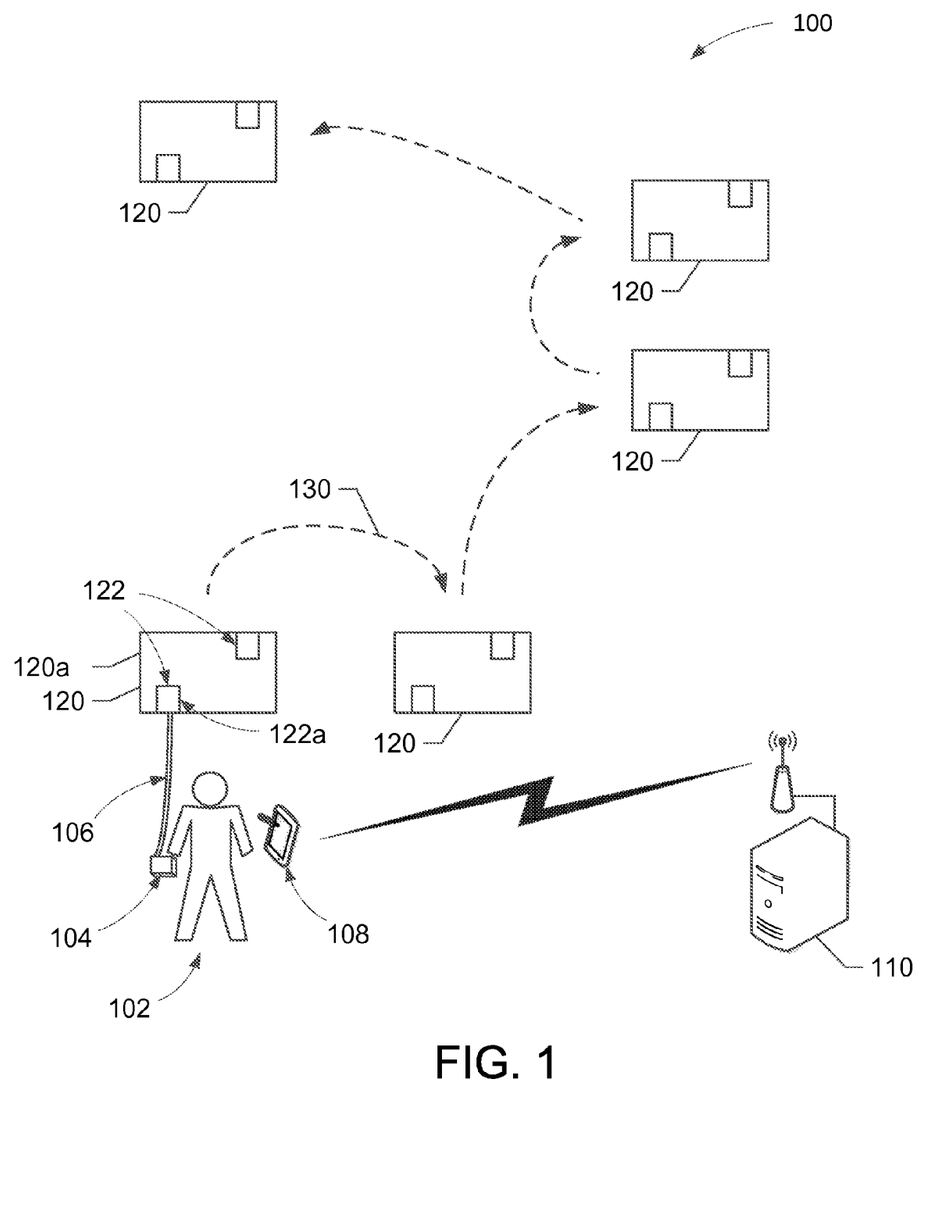
FIG. 1 is a diagram of a machine environment in which a field operator ("operator") collects vibration recordings from one or more subject machines such as turbines.

FIG. 1 is a diagram of a machine environment 100 in which a field operator ("operator") 102 collects vibration recordings from one or more subject machines such as, for example, turbines 120. In the exemplary embodiment, machine environment 100 is a power generation environment that includes a plurality of turbines 120, any of which may be regularly monitored for vibration during use. Operator 102 walks a path ("route") 130 through environment 100 and collects vibration recordings from turbines 120. To assist with the collection of vibration recordings, operator 102 carries a portable vibration recorder ("base unit") 104 and a mobile computing device ("handheld unit") 108 as she collects vibration recordings from turbines 120.

Base unit 104, in the exemplary embodiment, is a computing device configured at least to collect vibration sensor data (e.g., vibration recordings, or just "recordings"). Base unit 104 includes a sensor tether 106 which attaches to base unit 104 using a physical cable coupling at the base unit end, and a vibration sensor (not separately shown) at an opposite end. Base unit 104 also includes a wireless communications device such as a Bluetooth® adapter that facilitates wireless communication between base unit 104 and handheld unit 108 (e.g., transmission of vibration recordings to handheld unit 108).

Handheld unit 108, in the exemplary embodiment, is a computing device configured to visually present vibration data to operator 102 during use (e.g., while recording, at or just after data collection). In some embodiments, handheld unit 108 is a tablet computing device that includes a display interface that also functions as an input device, and may run, for example, the Android® operating system offered by Google Inc. of Mountain View, Calif. Handheld unit 108 includes one or more wireless network adapters. In the example embodiment, handheld unit 108 includes a Bluetooth® adapter that facilitates communication with at least base unit 104. In other embodiments, handheld unit 108 and base unit 104 include wired communication interfaces (e.g., USB) or network adapters (e.g., Ethernet), and are communicatively coupled together using these wired communication paths. Further, in some embodiments, handheld unit 108 also includes another wireless network adapter such as an 802.11 Wi-Fi adapter or a cellular network adapter that facilitates wireless communication with, for example, a vibration monitoring server 110. In some embodiments, handheld unit 108 and base unit 104 may be combined together into a single instrument.

During operation, in the exemplary embodiment, operator 102 carries base unit 104 and handheld unit 108 as she walks route 130 from turbine 120 to turbine 120. In some embodiments, handheld unit 108 presents route 130 to operator 102. For example, handheld unit 108 may display an ordered series of measurement locations (e.g., a particular turbine 120 and a particular measurement location 122 on that turbine) such as to define route 130 for operator 102. At each turbine 120, operator 102 stops to collect one or more vibration recordings. More specifically, handheld 108 identifies a particular measurement location 122a on a particular turbine 120a at which operator 102 is to capture a vibration recording. Operator 102 attaches sensor tether 106 of base unit 104 to measurement location 122a and initiates collection of a vibration recording. In some embodiments, base unit 104 includes a button that initiates recording. In other embodiments, handheld unit 108 presents a display interface including a virtual button that wirelessly initiates recording through communication to base unit 104. Vibration recordings may be digitized by handheld unit 108, base unit 104, or the vibration sensor itself.

In the example embodiment, the vibration recording is collected by base unit 104 and wirelessly transmitted via Bluetooth® to handheld unit 108. Handheld unit 108 receives the recording and displays data associated with the recording to operator 102. Operator 102 determines, from the display on handheld 108, whether or not the recording is corrupt. Operator 102 may take several recordings from the subject measurement location 122a prior to moving on to the next measurement location 122 and/or the next turbine 120. In some embodiments, handheld unit 108 wirelessly transmits the vibration recording to vibration monitoring server 110, e.g., for storage, for monitoring, and/or for further detailed analysis by a specialist.

As used herein, the term "corrupt" is used generally to indicate an improper, erroneous, incorrect, faulty, noisy, problematic, or otherwise bad recording. Corrupt recordings may occur from, for example, device failure or human error. For example, corrupt recordings may result from a sensor improperly attached to a machine, a failed or malfunctioning sensor or other recording equipment (e.g., cable fault), an improper sensor type (e.g., wrong sensitivity), a sensor attached to a measurement location other than an indicated machine location, or a recording taken from a machine other than an indicated machine.

The operations and data display of handheld 108 associated with the subject vibration recording are described in greater detail below in reference to FIG. 2.

Figure 2:
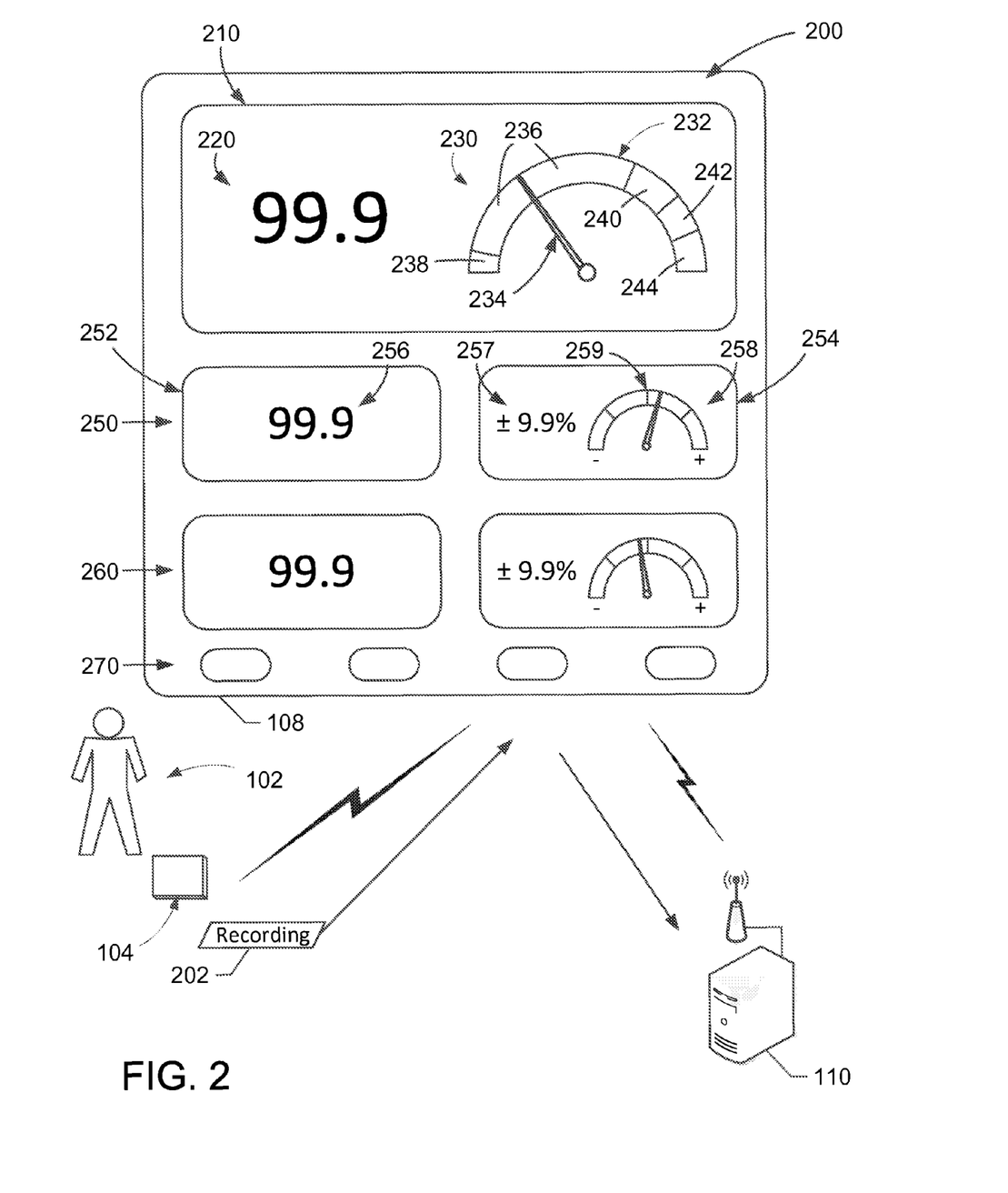
FIG. 2 is an exemplary diagram of a display (e.g., an interface screen) of a handheld unit that provides qualitative indication of vibration recordings to an operator during collection (e.g., just after collecting measurements at a subject turbine such as a measurement location of the turbine shown in FIG. 1)

FIG. 2 is an exemplary diagram of a display 200 (e.g., an interface screen) of handheld unit 108 that provides qualitative indication of vibration recordings to operator 102 during collection of a vibration recording 202 (e.g., just after collecting measurements at a subject turbine, such as at measurement location 122a of turbine 120a, shown in FIG. 1). In the exemplary embodiment, display 200 includes a primary display 210, a secondary pair of displays 250, a tertiary pair of displays 260, and a plurality of buttons 270. Display 200 is presented to operator 102 using a tablet display interface of handheld device 108 that acts as both a display screen for output of data to operator 102 as well as a touch-screen for input from operator 102.

Primary display 210, in the exemplary embodiment, includes an overall value 220 and an overall meter 230, both of which are associated with vibration recording 202 (e.g., a vibration recording of a turbine captured by operator 102 and base unit 104). Overall value 220 represents the total vibration level in recording 202. Overall value 220 may be expressed in many different ways such as, for example, in units of acceleration or velocity or displacement, in SI or Imperial units, as root mean square (rms), peak, or peak to peak "post scaling." Further, overall value 220 may be calculated over a frequency band that does not exactly match that of the actual recording, or it could be based on a reduced bandwidth (e.g., the ISO standard 10 hertz to 1 kilo-hertz band), or on a wider "unfiltered" band. The display of overall value 220 for recording 202 may provide a visual indicator to some more trained operators that may indicate the data integrity of recording 202. In other words, some operators may be able to tell whether or not the recording is corrupt just by looking at overall value 220.

Overall value meter 230 is a virtual gauge that, generally speaking, provides a qualitative visual indicator of recording 202 (e.g., of overall value 220). In some embodiments (e.g., if worst band alarm (1), described below, is used), overall value meter 230 may display a different value and not the overall value 220. In the exemplary embodiment, overall value meter 230 includes a plurality of primary threshold regions 232 ordered and arranged in a semi-circular configuration, and a dial arm 234 that serves to display where recording 202 (i.e., overall value 220) falls relative to the plurality of primary threshold regions 232. The plurality of primary threshold regions 232, in this example, includes a normal region 236, a first low region 238, a first high region 240, a second high region 242, and a third high region 244. Each region 232, generally speaking, defines a range of values in the same metric used by overall value 220. Further, each region 232 is contiguous with at least one neighboring region. As such, the boundary between regions 232 may be described herein as a threshold, or a value which defines a threshold between one region and another. Accordingly, dial arm 234 will point approximately to where, on the contiguous regions 232, the overall value 220 falls. This visual display provides a visual indicator to some operators that may indicate the data integrity of the recording.

For example, presume recording 202 includes an overall vibration value 220 of 0.3 in/s 0-pk. Also presume that primary threshold regions 232 are identified by handheld device 108 (e.g., in in/s 0-pk) as such:

TABLE 1

Example Threshold Regions for Overall Vibration Value

| Region Name | Lower Threshold | Upper Threshold | Region Color |
|---|---|---|---|
| First Low | n/a | <0.1 | Yellow |
| Normal | 0.1 | 0.4 | Green |
| First High | 0.4 | 0.6 | Yellow |
| Second High | 0.6 | 0.8 | Orange |
| Third High | >0.8 | n/a | Red |

As such, handheld device 108 displays overall vibration value 220 as 0.3 in/s 0-pk and, based on primary threshold regions 232 as illustrated by Table 1, handheld device 108 displays regions 232 as a semi-circular gauge, and also displays dial arm 234 at approximately where 0.3 in/s 0-pk falls relative to regions 232 (i.e., in approximately the middle of the "Green", or normal region 236. In this example, this gauge may provide a visual indicator to operator 102 indicating that recording 202 is not corrupt because the overall value collected from this measurement location falls in the middle of the normal range of operation, as defined by regions 232.

In the example embodiment, primary threshold regions 232 are defined by a threshold set. More specifically, primary threshold regions 232 are selected from a plurality of threshold sets (in some embodiments, referred to as a "threshold determination list") that includes: (1) a worst band alarm level for a particular measurement location; (2) an overall alarm level for a particular measurement location; (3) thresholds associated with a baseline value for a particular measurement location; (4) thresholds associated with a previous value for a particular measurement location; and (5) pre-set levels for a particular measurement type. Each of these list elements, generally speaking, represents a source of comparison data that may be used to determine whether or not the current recording 202 is corrupt.

A worst band alarm level (1) for a particular measurement location, in the example embodiment, involves a refined or narrowed look at recording 202. More specifically, in one embodiment, a particular frequency band or range of recording 202 is targeted for comparison. For example, the identified frequency range may be associated with a particular type of fault (e.g., a blade pass frequency on a fan). The worst band alarm level may identify this particular frequency range. As such, a sub-value of recording 202 may be extracted from recording 202 for this frequency range (i.e., the vibration value of recording 202 in the frequency range) and compared to one or more threshold ranges associated with that frequency range. In other words, a worst band alarm level identifies threshold regions associated with the specific frequency range rather than the entire overall vibration value (which may include vibrations over the entire frequency range). In some embodiments, a worst band alarm level includes a plurality of frequency ranges, along with associated vibration values (e.g., one for each range). In some embodiments, a single frequency range of a worst band alarm level may be identified and displayed on one of the displays 210, 250, or 260 (e.g., the alarm band having the worst outcome as compared to other bands, e.g., the highest alarm level). In some embodiments, another frequency range of a worst band alarm level may additionally be displayed on another of displays 210, 250, and 260. In some embodiments, the worst band alarm threshold set may be generalized to include other types of alarms not strictly defined by a frequency band. For example, waveform recordings may have alarm types on a "true peak to peak" value, and/or on a "crest factor" value.

An overall alarm level (2) for a particular measurement location, in the example embodiment, represents a set of pre-defined threshold values identified by, for example, a vibration analyst for a particular measurement location. In other words, an overall alarm level represents a set of alarm settings tailored for the particular machine and measurement location after consideration and study of overall values of that machine and measurement location by the analyst.

Thresholds associated with a baseline value (3) for a particular measurement location, in the example embodiment, represents a set of threshold values based at least in part on a value identified as a baseline value for the particular machine and measurement location. For example, in some embodiments, a vibration analyst may identify a baseline overall value that is representative of "normal" vibration of that machine at that location. In other embodiments, a vibration analyst may identify a recording as the baseline that is representative of "normal" vibration of that machine at that location (e.g., a recording taken after a machine is newly commissioned following an overhaul and appears to be running smoothly). As such, a set of threshold values may be defined around that baseline value or baseline recording. In other words, and for example, the baseline value may be set in the middle of a "normal" range, and other ranges (e.g., other thresholds) may be defined as a certain amount above or below that baseline value. In one embodiment, a baseline threshold set may be generated from baseline value or recording through a plurality of factors such as, for example, setting a low-warning threshold level at 0.5*the baseline value, a high-warning threshold level at 1.5*the baseline value, a high-alert threshold level at 2.0*the baseline value, and a high-danger threshold level at 3.0*the baseline value.

Thresholds associated with a prior value (4) for a particular measurement location, in the example embodiment, represents a set of threshold values based at least in part on a prior overall value collected from that particular machine and, more specifically, that particular measurement location. In some embodiments, the prior value is the most recently collected overall value prior to the current recording 202. Similar to thresholds associated with a baseline value, in some embodiments, the set of threshold values may be defined around this prior overall value, where the prior overall value is set in the middle of a "normal" range, and other ranges are defined as a certain amount above or below that prior value.

Pre-set levels for a particular measurement type, in the example embodiment, represents the least specific, least "customized" set of threshold values, as they are not based on a particular machine location. Rather, the pre-set levels for a particular measurement type are used, in the example embodiment, as a set of default threshold values to be used when none of the other elements from the threshold determination list are available. These levels are, for example, pre-defined for a particular measurement type, and are not specific to an individual machine. These may generally be described as a generic normal or set of defaults, for example, for a typical machine class.

Each of these threshold sets has some amount of specificity and/or accuracy in terms of determining corruption of the current recording 202. In the example embodiment, the threshold determination list is an ordered list, such as ordered (1) to (5) above. Further, each of these threshold sets may or may not exist for a particular machine (e.g., turbine 120a) or for a particular measurement location (e.g., measurement location 122a). In other words, there may not be data available for one or more of threshold sets (1) to (5). As such, in the example embodiment, the first threshold set for which there is available data is selected for use (e.g., selected as plurality of threshold regions 232). For example, presume that both an overall alarm level (2) for turbine 120a, measurement point 122a, and a default pre-set level (5) are both available as candidates for use as threshold regions 232, but the other three (1), (3), and (4) are not. As such, because of the nature of the ordered list (e.g., ordered by relevance to the specific measurement location), handheld unit 108 examines the availability of worst band alarm level (1) and, since this threshold set is not available (e.g., not defined for measurement point 122a), handheld unit 108 skips threshold set (1) and identifies an overall alarm level (2) as the selected threshold set for use (e.g., for use as threshold regions 232). As such, handheld unit 108 uses the overall alarm level threshold set as threshold regions 232.

In some embodiments, one or more of the above-described threshold sets may be excluded from the threshold determination list. Further, in some embodiments, a different pre-determined order may be used. In some embodiments, the user or an administrator such as a vibration analyst may be able to specify an order of the threshold determination list.

In the example embodiment, as described above, the first available threshold set for which there is data available is selected for use. In other embodiments, a plurality of available threshold sets may be used in combination. For example, in one embodiment, available list elements may be used in combination, such as merging thresholds and/or threshold regions of (2) and (3), perhaps also weighting one or more relative to the other(s), before comparing recording 202 to the plurality of combined regions 232. In other embodiments, operator 202 may select which one or more available threshold sets to use as regions 232 (e.g., select from the threshold determination list based on availability of each for measurement location 122a). Further, in some embodiments, display 210 may provide a visual indication as to which of threshold set is selected and in use by display 210.

In the exemplary embodiment, vibration monitoring server 110 stores data associated with regions 232 (e.g., the region names, threshold values, and region colors) for various measurement locations 122 of turbines 120 (shown in FIG. 1). During operation, handheld device 108 requests such threshold data (e.g., threshold set(s)) from vibration monitoring server 110 based on, for example, the current measurement location 122a of the subject turbine 120a. In some embodiments, this threshold data may be customized by analysts for each particular turbine 120a and/or each particular measurement location 122a. In some embodiments, the threshold data may be downloaded approximately at the time that recording 202 is collected. In other embodiments, the threshold data may be downloaded for an entire route 130 (shown in FIG. 1) (e.g., threshold sets for all of the measurement locations to be collected along that route 130) and, as such, handheld 108 may not need current wireless connectivity to server 110 to evaluate a given recording 202 on location.

Also in the exemplary embodiment, display 200 includes secondary pair of displays 250 that, generally speaking, represents additional comparison data associated with the subject machine (e.g., a prior recording also collected from measurement location 122a of turbine 120a). For example, presume primary display 210 shows comparison data based on an overall alarm level (2) (e.g., the first available threshold set in threshold determination list), and presume that there is also an available prior value (4). As such, secondary pair 250 includes a previous overall value display 252 and a difference-over-previous display 254. Previous overall value display 252 includes a previous overall value 256 (e.g., the prior value) that represents the prior overall value collected from the subject measurement location associated with recording 202.

Difference-over-previous display 254, in the exemplary embodiment, includes a difference value 257 and a difference gauge 258. Difference-over-previous display 254, generally speaking, represents a difference between previous overall recording value 256 and the subject (i.e., current) overall value 220. In this example, difference value 257 is displayed in this example as a percentage change between previous overall recording value 256 and overall value 220. For example, presume previous overall recording value 256=0.273 in/s 0-pk. As such, difference value, as a percentage, is shown as +10.0% (i.e., (current overall recording value—previous overall recording value) divided by previous overall recording value)). In other words, operator 102 may look at difference-over-previous display 254 and notice that the present recording is 10.0% higher than the previous recording. In other embodiments, difference value 257 may be expressed as an ordinary difference between the current overall recording value and the previous recording value. In the exemplary embodiment, difference gauge 258 is a plus-and-minus style gauge with 0.0 at a top position 259 of gauge 258. In other words, a positive difference value 257 would be displayed as a needle on the right side of gauge 258, and a negative difference value 257 would be displayed as a needle on the left side of gauge 258.

In the exemplary embodiment, display 200 includes tertiary pair of displays 260 that are similar to secondary pair of displays 250, but that generally represent still other comparison data associated with the subject machine (e.g., a baseline value associated with measurement location 122a of turbine 120a). In some embodiments, an analyst may provide a baseline vibration value for a particular measurement location that represents a "ideal", representative vibration value associated with that measurement location (according to the analyst). Similar to the previous overall value difference described above, displays 260 show a baseline value 256, a difference value 257 between the current overall value 220 and the baseline value 256, and a corresponding plus-minus gauge 258.

In the example embodiment shown in FIG. 2, display 200 includes a primary display 210 directed toward the first available data from the threshold determination list, secondary display 250 is directed toward a previous value (e.g., list element (4)), and tertiary display 260 is directed toward a baseline value (e.g., list element (3)), all as described above. In other embodiments, display 200 includes only a primary display 210 directed to the first available data from the threshold determination list. In some embodiments, display 200 also includes one or more additional displays (e.g., similar to secondary display 250), where each additional display is directed to one of the other available elements from the threshold determination list. And in some embodiments, these additional displays are presented in the order defined by the threshold determination list.

Also, in the exemplary embodiment, display 200 includes a plurality of buttons 270. During operation, buttons 270 may be used to prompt handheld device 108 to, for example, re-measure (i.e., collect another recording), or to change between various individual measurement locations 122 and/or turbines 120, or to upload recording data to server 110, or to download data associated with the subject turbine 120a and/or measurement location 122a, such as threshold values, previous overall values, or baseline values. In one embodiment, base unit 104 may be connected to a plurality of sensors and, as such, may capture a plurality of recordings simultaneously. Accordingly, a "channel" button may also be included such that operator 102 may toggle between the plurality of channels.

It should be understood that while some readings 202 may be corrupt, and thus may be indicated as such using threshold ranges as described above, other non-corrupt readings 202 may similarly generate values in any of those same threshold ranges. In other words, some readings 202 may generate values outside of the "normal" range, and those readings may be legitimate (i.e., not corrupt). For example, a machine experiencing mechanical difficulties (e.g., greater than normal vibrations) may present an overall vibration value that falls outside of what is expected. As such, operator 102 may or may not be able to determine, from one reading 202, whether or not the reading is corrupt or legitimate. In such situations, operator 102 may, for example, check other variables such as the current monitoring location and sensor mounting to determine whether or not she may have done something wrong. Operator 102 may collect additional readings 202 while troubleshooting whether or not the data is corrupt or legitimate.

Figure 3:
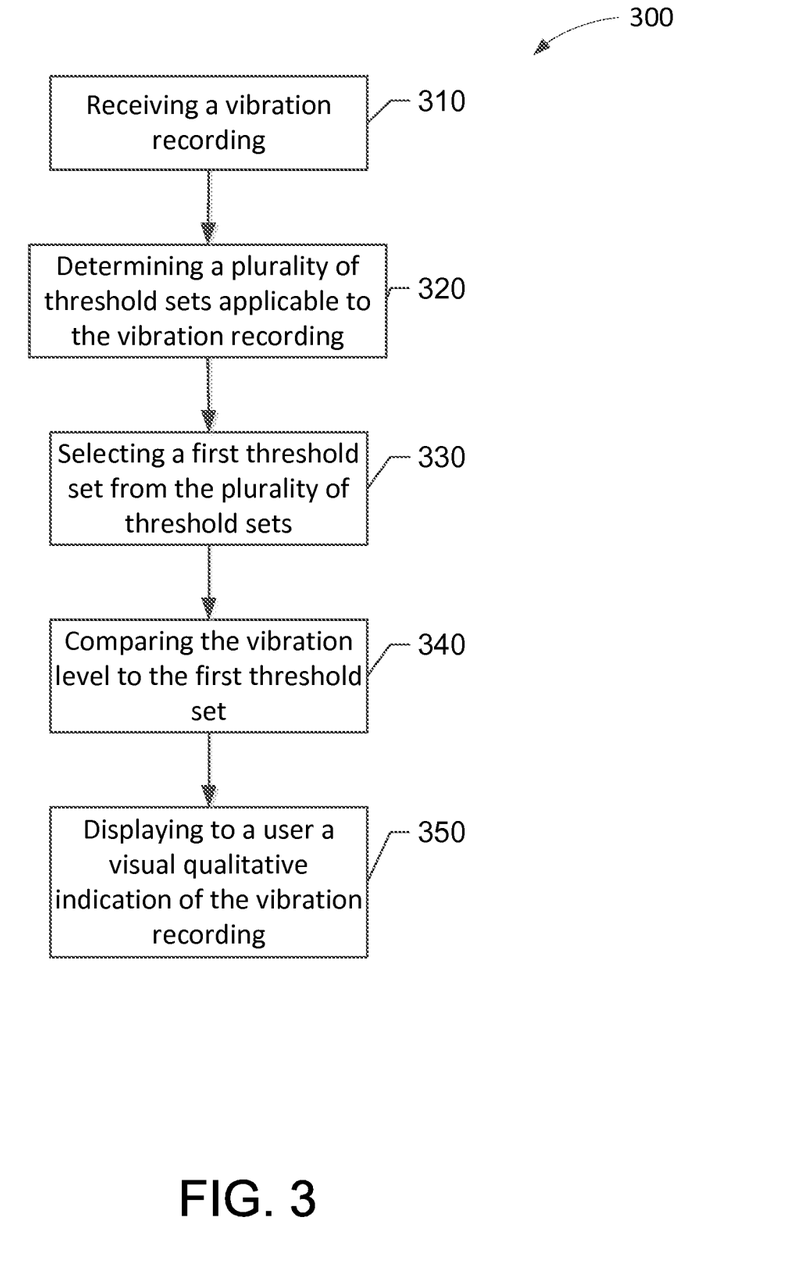
FIG. 3 is an exemplary method for providing qualitative indication of vibration recordings to a user (e.g., the operator shown in FIG. 1) during collection of vibration data while on location (e.g., while at the turbine shown in FIG. 1)

FIG. 3 is an exemplary method 300 for providing qualitative indication of vibration recordings to a user (e.g., operator 102, shown in FIG. 1) during collection of vibration data while on location (e.g., while at turbine 120, shown in FIG. 1). In some embodiments, method 300 may be implemented by handheld device 108 (shown in FIGS. 1 and 2) and/or computing device 420 (shown in FIG. 4). In the exemplary embodiment, method 300 includes receiving 310, into the memory, a vibration recording from a sensor computing device. The vibration recording includes a vibration level. Further, collection of the vibration recording is initiated by the user while at the vibrating machine.

In the example embodiment, method 300 also includes determining 320, by the processor, a plurality of threshold sets applicable to the vibration recording. Method 300 also includes selecting 330, by the processor, a first threshold set from the plurality of threshold sets. In some embodiments, the plurality of sets of thresholds includes an ordered list of sets of thresholds, and selecting 330 a first threshold set further includes selecting a first threshold set based at least in part on being a first available threshold set in the ordered list. In other embodiments, method 300 includes identifying a first threshold set associated with a first pre-defined frequency range and a second threshold set associated with a second pre-defined frequency range and determining a first alarm level for the first pre-defined frequency range of the vibration recording and a second alarm level for the second pre-defined frequency range of the vibration recording, and selecting 330 a first available threshold set further includes selecting one of the first threshold set and the second threshold set as the first available threshold set based at least in part on comparing the first alarm level to the second alarm level. In still other embodiments, selecting 330 a first threshold set associated with an overall vibration value of the vibrating machine, wherein the overall vibration value is a pre-determined value for a measurement type associated with the vibration recording and a measurement location associated with the vibration recording. In still other embodiments, collection of the vibration recording is performed at a first measurement location, and selecting 330 a first threshold set further includes computing a first threshold set associated with one of (i) a baseline value and (ii) a prior recording of the vibrating machine associated with the first measurement location.

Method 300, in the example embodiment, also includes comparing 340, by the processor, the vibration level to the first threshold set. Method 300 also includes displaying 350 to the user, using the display device, a visual qualitative indication of the vibration recording using the display device, thereby enabling the user to determine a quality of the vibration recording while at the vibrating machine. In some embodiments, the visual qualitative indication includes a gauge display representing the first threshold set and a visual indicator of a value of the vibration recording projected relative to the first threshold set. In other embodiments, method 300 also includes comparing the vibration recording to a second threshold set, and displaying to the user, with the visual qualitative indication, another visual qualitative indication based at least in part on comparing the vibration recording to the second threshold set.

Figure 4:
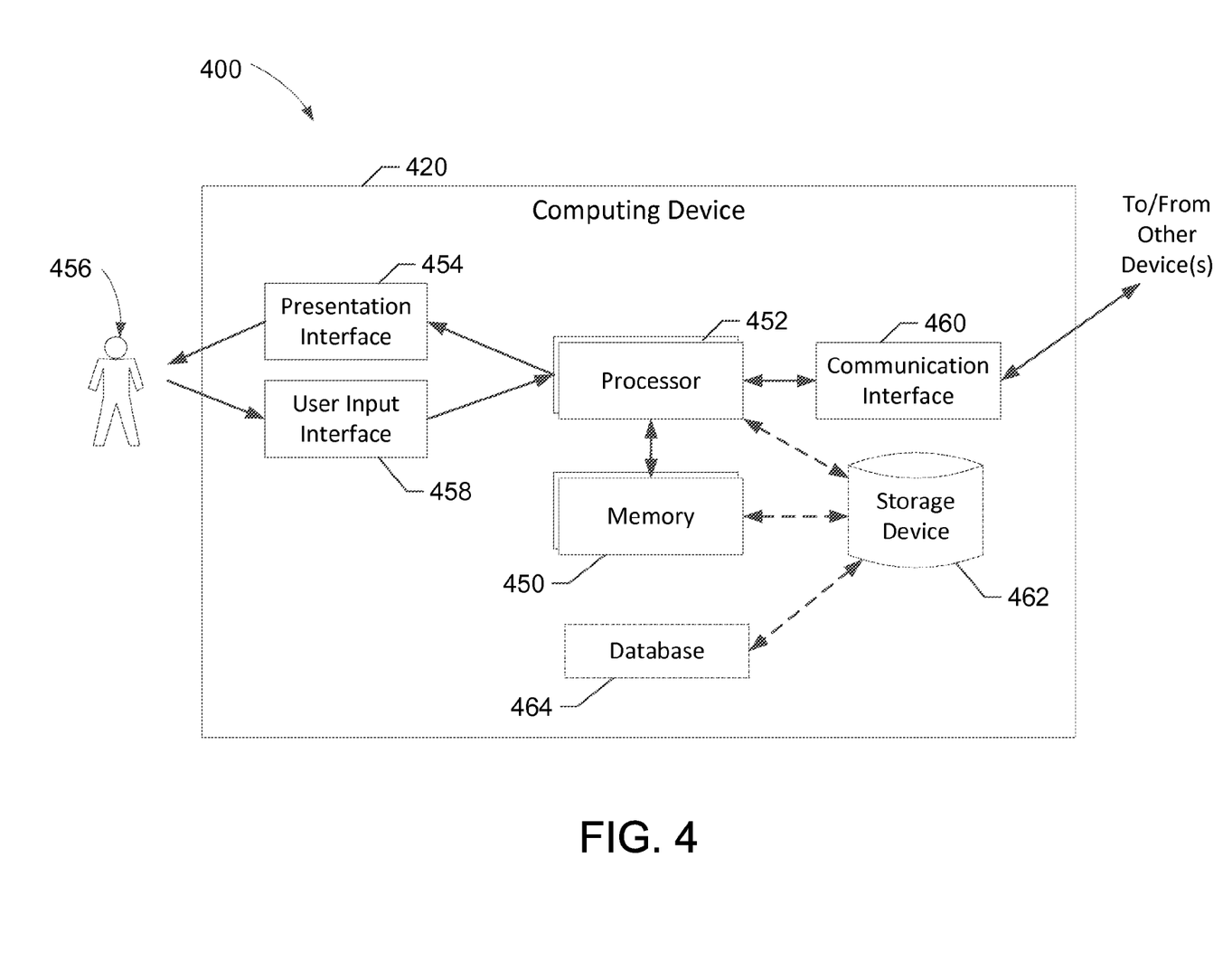
FIG. 4 is a block diagram of an exemplary computing system that may be used to provide qualitative indication of vibration recordings to a user (e.g., the operator shown in FIG. 1) during collection of vibration data while on location.

FIG. 4 is a block diagram 400 of an exemplary computing system 420 that may be used to provide qualitative indication of vibration recordings to a user (e.g., operator 102, shown in FIG. 1) during collection of vibration data while on location. In some embodiments, computing system 420 may be handheld device 108 (shown in FIGS. 1 and 2) and/or server 110 (shown in FIGS. 1 and 2). Alternatively, any computer architecture that enables operation of computing system 420 as described herein may be used.

In the exemplary embodiment, computing system 420 includes a memory device 450 and a processor 452 operatively coupled to memory device 450 for executing instructions. In some embodiments, executable instructions are stored in memory device 450. Computing system 420 is configurable to perform one or more operations described herein by programming processor 452. For example, processor 452 may be programmed by encoding an operation as one or more executable instructions and providing the executable instructions in memory device 450. Processor 452 may include one or more processing units, e.g., without limitation, in a multi-core configuration.

Further, in the exemplary embodiment, memory device 450 is one or more devices that enable storage and retrieval of information such as executable instructions and/or other data. Memory device 450 may include one or more tangible, non-transitory computer-readable media, such as, without limitation, random access memory (RAM), dynamic random access memory (DRAM), static random access memory (SRAM), a solid state disk, a hard disk, read-only memory (ROM), erasable programmable ROM (EPROM), electrically erasable programmable ROM (EEPROM), and/or non-volatile RAM (NVRAM) memory. The above memory types are exemplary only, and are thus not limiting as to the types of memory usable for storage of a computer program.

In some embodiments, computing system 420 includes a presentation interface 454 coupled to processor 452. Presentation interface 454 presents information, such as a user interface and/or an alarm, to a user 456. For example, presentation interface 454 may include a display adapter (not shown) that may be coupled to a display device (not shown), such as a cathode ray tube (CRT), a liquid crystal display (LCD), an organic LED (OLED) display, and/or a hand-held device with a display. In some embodiments, presentation interface 454 includes one or more display devices. In addition, or alternatively, presentation interface 454 may include an audio output device (not shown), e.g., an audio adapter and/or a speaker.

In some embodiments, computing system 420 includes a user input interface 458. In the exemplary embodiment, user input interface 458 is coupled to processor 452 and receives input from user 456. User input interface 458 may include, for example, a keyboard, a pointing device, a mouse, a stylus, and/or a touch sensitive panel, e.g., a touch pad or a touch screen. A single component, such as a touch screen, may function as both a display device of presentation interface 454 and user input interface 458.

Further, one or more communication interfaces 460 are coupled to processor 452 and are configured to be coupled in communication with one or more other devices such as, without limitation, another computing system 420, one or more turbines 120 (shown in FIGS. 1 and 2), one or more sensor devices 104 (shown in FIG. 1), server 110 (shown in FIGS. 1 and 2), and any device capable of accessing computing system 420 including, without limitation, a portable laptop computer, a personal digital assistant (PDA), and a smart phone. Communication interface 460 may include, without limitation, a wired network adapter, wireless network adapters (e.g., Bluetooth® and/or IEEE 802.11 Wi-Fi), a mobile telecommunications adapter, a serial communication adapter, and/or a parallel communication adapter. Communication interface 460 may receive data from and/or transmit data to one or more remote devices. Computing system 420 may be web-enabled for remote communications, for example, with a remote desktop computer (not shown).

Also, presentation interface 454 and/or communication interface 460 are both capable of providing information suitable for use with the methods described herein, e.g., to user 456 or another device. Accordingly, presentation interface 454 and communication interface 460 may be referred to as output devices. Similarly, user input interface 458 and communication interface 460 are capable of receiving information suitable for use with the methods described herein and may be referred to as input devices.

Further, processor 452 and/or memory device 450 may also be operatively coupled to a storage device 462. Storage device 462 is any computer-operated hardware suitable for storing and/or retrieving data, such as, but not limited to, data associated with a database 464. In the exemplary embodiment, storage device 462 is integrated in computing system 420. For example, computing system 420 may include one or more hard disk drives as storage device 462. Moreover, for example, storage device 462 may include multiple storage units such as hard disks and/or solid state disks in a redundant array of inexpensive disks (RAID) configuration. Storage device 462 may include a storage area network (SAN), a network attached storage (NAS) system, and/or cloud-based storage. Alternatively, storage device 462 is external to computing system 420 and may be accessed by a storage interface (not shown).

Moreover, in the exemplary embodiment, database 464 contains a variety of static and dynamic operational data associated with monitoring data.

Figure 5:
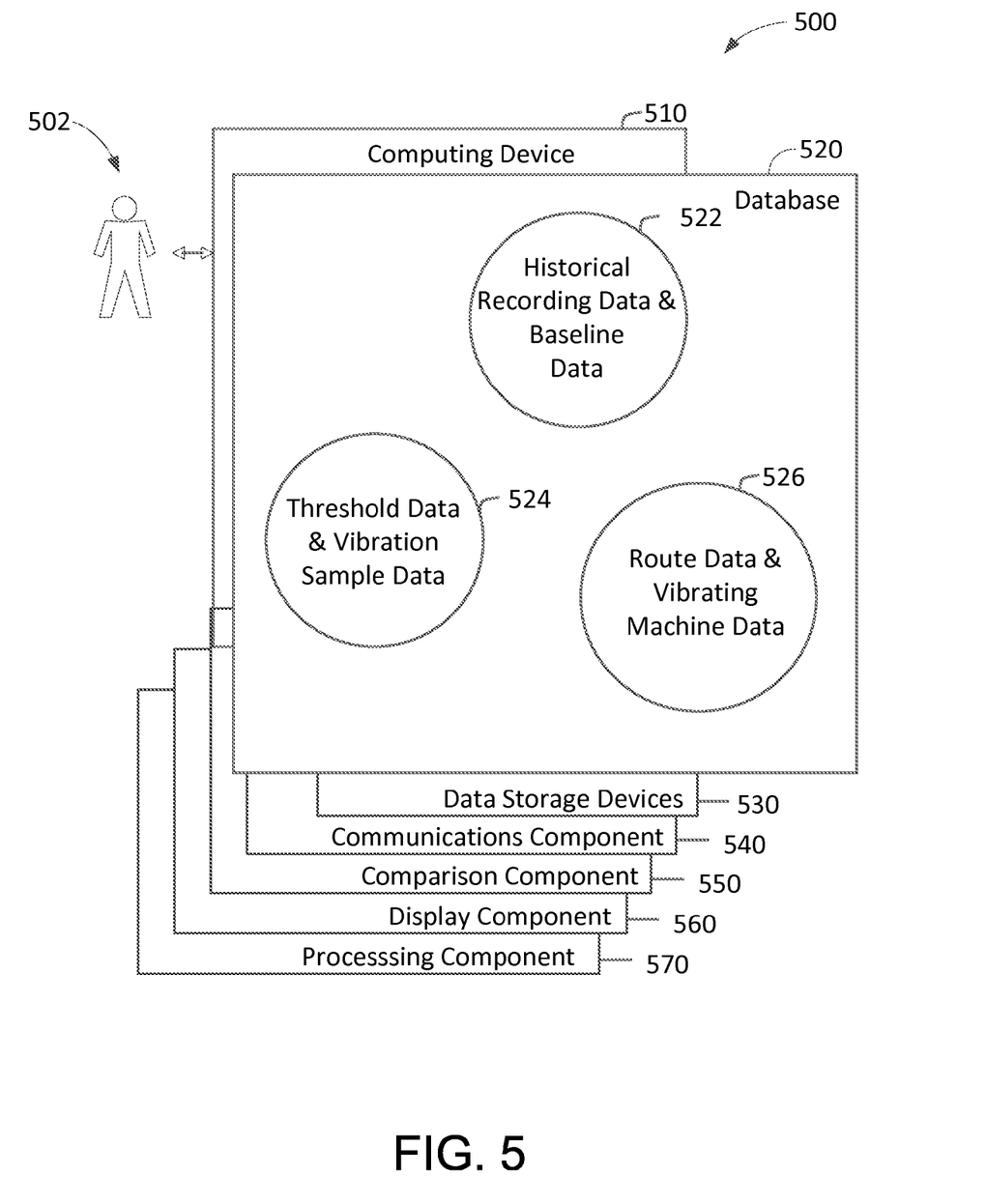
FIG. 5 illustrates an exemplary configuration of a database within a computing device, along with other related computing components, that may be used to provide qualitative indication of vibration recordings to a user (e.g., the operator shown in FIG. 1) during collection of vibration data while on location as described herein.

FIG. 5 illustrates an exemplary configuration 500 of a database 520 within a computing device 510, along with other related computing components, that may be used to provide qualitative indication of vibration recordings to a user (e.g., operator 102, shown in FIG. 1) during collection of vibration data while on location as described herein. Database 520 is coupled to several separate components within computing device 510, which perform specific tasks. In the exemplary embodiment, computing device 510 may be computing device 420 (shown in FIG. 4), base unit 104 (shown in FIGS. 1 and 2), handheld device 108 (shown in FIGS. 1 and 2), and/or server 110 (shown in FIGS. 1 and 2).

In the exemplary embodiment, database 520 includes historical recording data & baseline data 522, threshold data & vibration recording data 524, and route data & vibrating machine data 526. Historical recording data & baseline data 522 includes information associated with the historical recordings and baselines of vibrating machines such as turbines 120 (shown in FIG. 1). Threshold data & vibration recording data 524 includes information associated with current vibration recordings and threshold data associated with vibrating machines. Route data & vibrating machine data 526 includes information associated with routes 130 (shown in FIG. 1) and the associated vibrating machines.

Computing device 510 includes the database 520, as well as data storage devices 530. Computing device 510 also includes a communications component 540 for operations such as transmitting data to and from other computing devices. Computing device 510 also includes a comparison component 550 for comparing vibration recordings to thresholds, historical recordings, and/or baseline values. A display component 560 is also included for providing qualitative indications to a user 502. A processing component 570 assists with execution of computer-executable instructions associated with the system.

The embodiments illustrated and described herein, as well as embodiments not specifically described herein, but, within the scope of aspects of the disclosure, constitute exemplary means for providing qualitative indication of vibration recordings to a user (e.g., operator 102, shown in FIG. 1) during collection of a vibration recording while on location. For example, computing device 420, and any other similar computer device added thereto or included within, when integrated together, include sufficient computer-readable storage media that is/are programmed with sufficient computer-executable instructions to execute processes and techniques with a processor as described herein. Specifically, computing device 420 and any other similar computer device added thereto or included within, when integrated together, constitute an exemplary means for providing qualitative indication of vibration recordings to a user during collection of a vibration recording while on location as described herein.

An exemplary technical effect of the methods, systems, and apparatus described herein includes at least one of: (a) enabling a field operator to determine whether a collected recording is corrupt or contains bad data; (b) compare a recently taken vibration recording against historic recordings; (c) visually distinguish corrupt recording data using a simple display; (d) compare recording data to threshold values; (e) inspect recording data quality while on location with a subject machine; and (f) selecting comparison data based from a plurality of options based at least in part on availability and relevance.

Exemplary embodiments of systems and methods for providing qualitative indication of vibration recordings to a user during collection of a vibration recording while on location are described above in detail. The systems and methods described herein are not limited to the specific embodiments described herein, but rather, components of systems and/or steps of the methods may be utilized independently and separately from other components and/or steps described herein. For example, the methods may also be used in combination with other monitoring systems, and are not limited to practice with only the monitoring systems and methods as described herein. Rather, the exemplary embodiments can be implemented and utilized in connection with many other monitoring and communications applications.

Although specific features of various embodiments may be shown in some drawings and not in others, this is for convenience only. In accordance with the principles of the systems and methods described herein, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A mobile computing system for providing qualitative indication of vibration recordings of a vibrating machine to a user, the mobile computing system comprising:
   a memory;
   a display device; and
   at least one processor, wherein the at least one processor is configured to:
      receive a vibration recording from a sensor computing device, the vibration recording including a vibration level, wherein collection of the vibration recording is initiated by the user while at the vibrating machine;
      determine, by the processor, a plurality of threshold sets applicable to the vibration recording, the plurality of threshold sets organized into an ordered list;
      select, by the processor, a first threshold set from the plurality of threshold sets based at least in part on being a first available threshold set in the ordered list;
      compare the vibration level of the vibration recording to the first threshold set; and
      display to the user a visual qualitative indication of the vibration recording using the display device, thereby enabling the user to determine a quality of the vibration recording while at the vibrating machine.

2. The mobile computing system of claim 1, wherein the at least one processor is further configured to:
   identify a first threshold set associated with a first pre-defined frequency range and a second threshold set associated with a second pre-defined frequency range; and
   determine a first alarm level for the first pre-defined frequency range of the vibration recording and a second alarm level for the second pre-defined frequency range of the vibration recording,
   wherein selecting a first available threshold set further includes selecting one of the first threshold set and the second threshold set as the first available threshold set based at least in part on comparing the first alarm level to the second alarm level.

3. The mobile computing system of claim 1, wherein the at least one processor is further configured to select a first threshold set associated with an overall vibration value of the vibrating machine, wherein the overall vibration value is a pre-determined value for a measurement type associated with the vibration recording and a measurement location associated with the vibration recording.

4. The mobile computing system of claim 1, wherein collection of the vibration recording is performed at a first measurement location, wherein the at least one processor is further configured to compute a first threshold set associated with one of (i) a baseline value and (ii) a prior recording of the vibrating machine associated with the first measurement location.

5. The mobile computing system of claim 1, wherein the visual qualitative indication includes a gauge display representing the first threshold set and a visual indicator of a value of the vibration recording projected relative to the first threshold set.

6. The mobile computing system of claim 1, wherein the at least one processor is further configured to:
   compare the vibration recording to a second threshold set; and
   display to the user, with the visual qualitative indication, another visual qualitative indication based at least in part on comparing the vibration recording to the second threshold set.

7. A computer-based method for providing qualitative indication of vibration recordings of a vibrating machine to a user, said method uses a mobile computing device including a processor, a memory, and a display device, said method comprising:
   receiving, into the memory, a vibration recording from a sensor computing device, the vibration recording including a vibration level, wherein collection of the vibration recording is initiated by the user while at the vibrating machine;
   determining, by the processor, a plurality of threshold sets applicable to the vibration recording, the plurality of threshold sets organized in an ordered list;
   selecting, by the processor, a first threshold set from the plurality of threshold sets based at least in part on being a first available threshold set in the ordered list;
   comparing, by the processor, the vibration level to the first threshold set; and
   displaying to the user, using the display device, a visual qualitative indication of the vibration recording using the display device, thereby enabling the user to determine a quality of the vibration recording while at the vibrating machine.

8. The method of claim 7 further comprising:
   identifying a first threshold set associated with a first pre-defined frequency range and a second threshold set associated with a second pre-defined frequency range; and
   determining a first alarm level for the first pre-defined frequency range of the vibration recording and a second alarm level for the second pre-defined frequency range of the vibration recording,
   wherein selecting a first available threshold set further includes selecting one of the first threshold set and the second threshold set as the first available threshold set based at least in part on comparing the first alarm level to the second alarm level.

9. The method of claim 7, wherein selecting a first threshold set further includes selecting a first threshold set associated with an overall vibration value of the vibrating machine, wherein the overall vibration value is a pre-determined value for a measurement type associated with the vibration recording and a measurement location associated with the vibration recording.

10. The method of claim 7, wherein collection of the vibration recording is performed at a first measurement location, wherein selecting a first threshold set further includes computing a first threshold set associated with one of (i) a baseline value and (ii) a prior recording of the vibrating machine associated with the first measurement location.

11. The method of claim 7, wherein the visual qualitative indication includes a gauge display representing the first threshold set and a visual indicator of a value of the vibration recording projected relative to the first threshold set.

12. The method of claim 7 further comprising:
   comparing the vibration recording to a second threshold set; and
   displaying to the user, with the visual qualitative indication, another visual qualitative indication based at least in part on comparing the vibration recording to the second threshold set.

13. At least one non-transitory computer-readable storage media having computer-executable instructions embodied thereon, wherein when executed by at least one processor of a first computing device, the computer-executable instructions cause the processor to:
   receive a vibration recording from a sensor computing device, the vibration recording including a vibration level, wherein collection of the vibration recording is initiated by a user while at a vibrating machine;
   determine, by the processor, a plurality of threshold sets applicable to the vibration recording, the plurality of threshold sets organized in an ordered list;
   select, by the processor, a first threshold set from the plurality of threshold sets based at least in part on being a first available threshold set in the ordered list;
   compare the vibration level to the first threshold set; and
   display to the user a visual qualitative indication of the vibration recording using a display device, thereby enabling the user to determine a quality of the vibration recording while at the vibrating machine.

14. The computer-readable storage media of claim 13, wherein the computer-executable instructions further cause the processor to:
   identify a first threshold set associated with a first pre-defined frequency range and a second threshold set associated with a second pre-defined frequency range; and determine a first alarm level for the first pre-defined frequency range of the vibration recording and a second alarm level for the second pre-defined frequency range of the vibration recording, wherein selecting a first available threshold set further includes selecting one of the first threshold set and the second threshold set as the first available threshold set based at least in part on comparing the first alarm level to the second alarm level.

15. The computer-readable storage media of claim 13, wherein the computer-executable instructions further cause the processor to select a first threshold set associated with an overall vibration value of the vibrating machine, wherein the overall vibration value is a pre-determined value for a measurement type associated with the vibration recording and a measurement location associated with the vibration recording.

16. The computer-readable storage media of claim 13, wherein collection of the vibration recording is performed at a first measurement location, wherein the computer-executable instructions further cause the processor to compute a first threshold set associated with one of (i) a baseline value and (ii) a prior recording of the vibrating machine associated with the first measurement location.

17. The computer-readable storage media of claim 13, wherein the visual qualitative indication includes a gauge display representing the first threshold set and a visual indicator of a value of the vibration recording projected relative to the first threshold set.

* * * * *